US006361097B1

(12) United States Patent
Lechkun

(10) Patent No.: US 6,361,097 B1
(45) Date of Patent: Mar. 26, 2002

(54) STOWABLE DECK LID

(75) Inventor: David Michael Lechkun, Shelby Twp., MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,528

(22) Filed: Apr. 24, 2001

(51) Int. Cl.⁷ .................................................. B60R 5/00
(52) U.S. Cl. ................... 296/37.1; 296/76; 296/107.08; 296/37.1
(58) Field of Search .................... 296/37.1, 76, 187, 296/191, 196, 195, 197, 29, 107.08

(56) References Cited

U.S. PATENT DOCUMENTS

| | | |
|---|---|---|
| 1,766,015 A | 6/1930 | Dupre |
| 2,762,648 A | 9/1956 | Huzzard |
| 2,936,195 A | 5/1960 | Schutte |
| 3,019,046 A | 1/1962 | Laster |
| 3,971,589 A * | 7/1976 | Elrod ........................... 296/76 |
| 4,168,859 A | 9/1979 | Breitschwerdt et al. |
| 4,337,976 A | 7/1982 | Lapine et al. |
| 4,413,854 A * | 11/1983 | Hirshberg ..................... 296/76 |
| 4,543,747 A | 10/1985 | Kaltz et al. |
| 4,620,746 A | 11/1986 | Alexander |
| 5,062,182 A * | 11/1991 | Griffiths et al. ............... 16/368 |
| 5,135,280 A * | 8/1992 | Geletka ........................ 296/76 |
| 5,150,939 A * | 9/1992 | Simin ......................... 296/37.1 |
| 5,195,796 A * | 3/1993 | Wampler, II .................. 296/76 |
| 5,769,483 A * | 6/1998 | Danzle et al. ............... 296/107 |
| 5,944,378 A * | 8/1999 | Mather et al. ......... 296/107.08 |
| 6,073,985 A * | 6/2000 | Keip .......................... 296/37.6 |
| 6,193,300 B1 * | 2/2001 | Nakatomi et al. ..... 296/107.08 |
| 6,217,104 B1 * | 4/2001 | Neubrand .............. 296/107.08 |
| 6,293,605 B2 * | 9/2001 | Neubrand ..................... 296/76 |

* cited by examiner

Primary Examiner—Joseph D. Pape
Assistant Examiner—Kiran B. Patel

(57) ABSTRACT

A trunk assembly (10) is provided, including a cargo compartment (22) and a deck lid (12), moveable between an open position (14), a closed position (16), and a stowed position (18), such that the stowed position 18 allows the cargo compartment 22 to be used as a pick up box.

16 Claims, 5 Drawing Sheets

STOWABLE DECK LID

BACKGROUND OF INVENTION

The present invention relates generally to a deck lid assembly and more particularly to a deck lid assembly capable of being stowed such that the cargo area may be used as a pick up box.

Increasing the functionality of automobiles is an important aspect of automotive design. Adding functionality to automotive designs can not only increase customer satisfaction and convenience, but may lead to improved sales and increased profits. One area of known importance to consumers is storage capacity. Consumers often utilize their automobiles for a wide variety of purposes in which storage capacity may be a premium.

Nowhere is this concern for the increased storage capacity more evident than in the popularity of light trucks. Pickup trucks, SUVs, and other light trucks offer consumers the ability to store and transport items of a size and number not typically obtainable in standard automobile design. Although light trucks offer such increased functionality, they often carry with them disadvantages. The size and weight of many light trucks may result in poor fuel efficiency, higher operating costs, and in the case of pickup trucks, reduced passenger capacity. In addition, the extended payload capacity of such vehicles may only be required by the consumer on occasion. Yet, in order to have such increased capacity available, the consumer must suffer with the accompanying disadvantages regularly.

Standard automotive designs, as opposed to light trucks, have made great progress in improving efficiency, gas mileage and performance. These improvements, however, often come at the expense of reduced cargo storage capacity. The primary storage area in most automobiles still resides in the trunk. As the general size and weight of automobiles has decreased, so too has the storage capacity of many trunks. Automotive designers have attempted to compensate for this reduced capacity by adding features such as fold down rear seats to increase trunk volume. The depth of the trunk, however, still creates size limitations on objects that can be placed within it.

One common method of compensating for oversized objects has traditionally been to leave the deck lid open while transporting oversized objects. This solution, however, has its disadvantages. The movement of the deck lid can still create limitations on objects placed within the trunk. In addition, while the deck lid is open, often the driver's line of sight out the rear window can be seriously impaired. Finally, proper securing of the open deck lid may be required to prevent damage to either the deck lid or the stowed object during transport. These disadvantages create a need for an improved method of storage and transport of oversized objects in standard automobiles.

It would, therefore, be highly desirable to have an improvement in automotive deck lid design that would allow for the storage and transport of oversized objects commonly as associated with light trucks while capable of being used on standard automotive designs.

SUMMARY OF INVENTION

It is, therefore, an object of the present invention to provide a trunk assembly with improved utility and stowage capabilities.

In accordance with the objects of the present invention, a trunk assembly is provided. The trunk assembly includes a cargo compartment and a deck lid. The deck lid is movable between an open position, a closed position, and a stowed position. When the deck lid is in the stowed position, the cargo compartment can be used as a pick up box.

Other objects and features of the present invention will become apparent when viewed in light of the detailed description of the preferred embodiment when taken in conjunction with the attached drawings and the appended claims.

DETAILED DESCRIPTION

Figure 1:
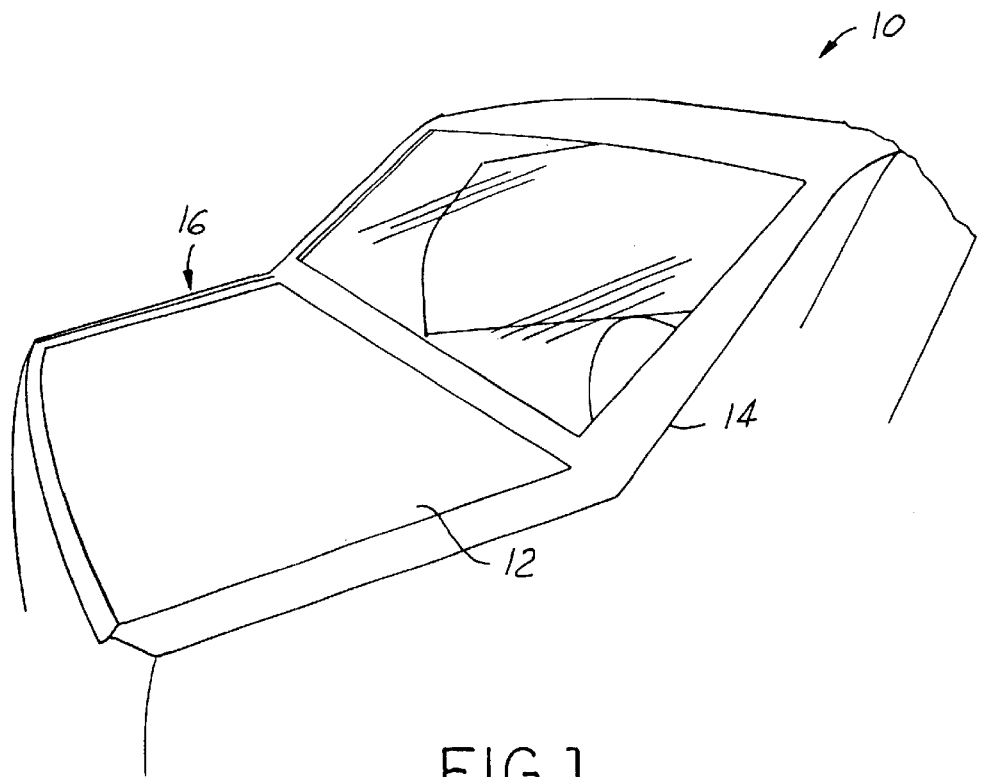
FIG. 1 is an illustration of an embodiment of a trunk assembly in accordance with the present invention, the deck lid illustrated in a closed position.
Figure 2:
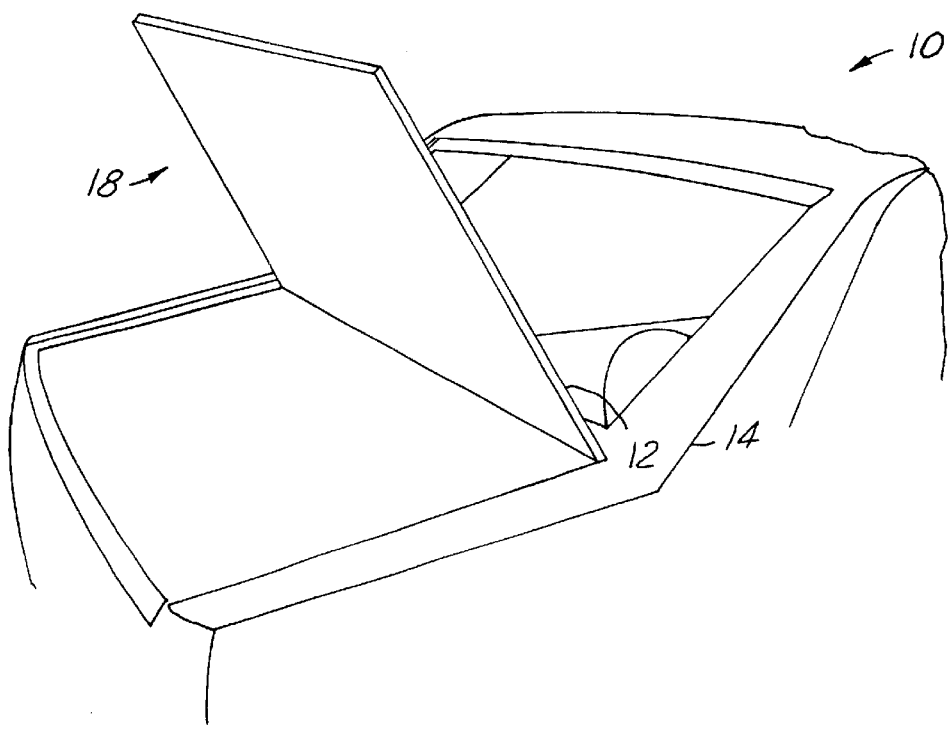
FIG. 2 is an illustration of an embodiment of a trunk assembly in accordance with the present invention, the deck lid illustrated in an open position.

Referring now to FIG. 1, which is an illustration of a trunk assembly 10 in accordance with the present invention. The trunk assembly 10 includes a deck lid 12 in communication with an automobile 14. The shape and configuration of the deck lid 12 and automobile 14 are for illustrative purposes only. A wide variety of shapes and configurations for deck lids 12 and automobiles 14 are contemplated. The deck lid 12 is illustrated in FIG. 1 in the closed position 16. The design and use of deck lids 12 moveable between a closed position 16 and an open position 18 (see FIG. 2) are well-known in the prior art.

Figure 3:
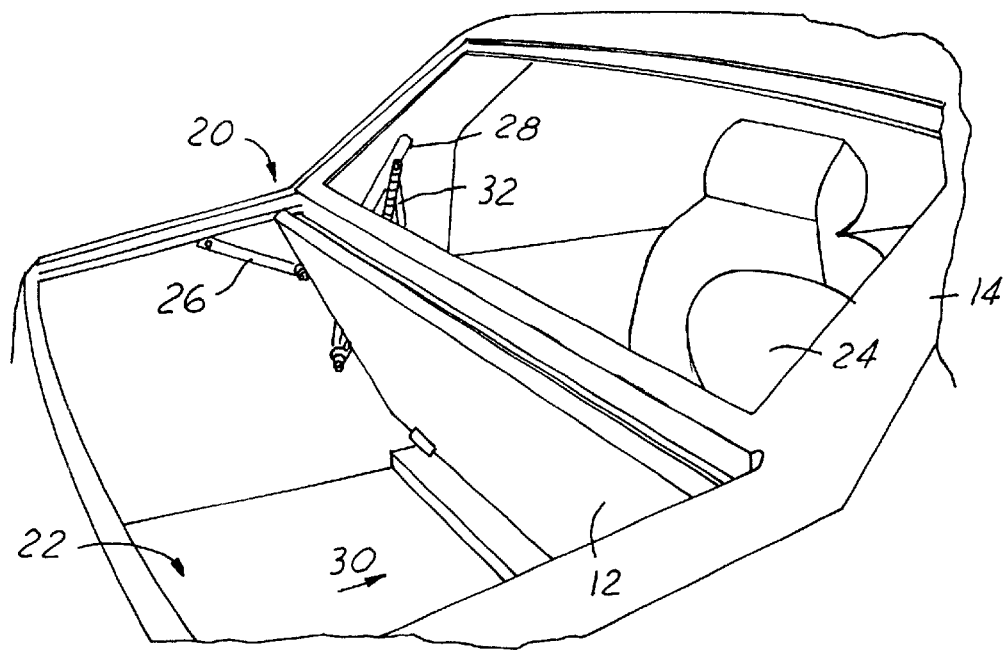
FIG. 3 is an illustration of a trunk assembly in accordance with the present invention, the deck lid shown in a stowed position.

The present invention has improvements over such known prior art, by including a deck lid 12 that is further moveable to a stowed position 20 (as shown in FIG. 3). The stowed position 20 allows the cargo area 22 to be used as a pick up box (the truck bed normally found in the rear of pickup trucks). It should be understood that although the deck lid 12 has been described as having a closed position 16, an open position 18, and a stowed position 20, in alternate embodiments the deck lid 12 need not have an open position 18 independent from the stowed position 20.

The stowed position 20 allows for oversized objects to be placed within the cargo area 22 without the normal problems commonly associated with deck lid interference. While the deck lid 12 is in the stowed position 20, it becomes easier for owners to load and unload oversized and heavy objects. In addition, there is no necessity to tie down the deck lid 12, a common practice for accommodating oversized objects in present vehicles. Finally, when storing slightly oversized objects, the deck lid 12 no longer blocks the driver's view through the rear view mirror (not shown).

Figure 4:
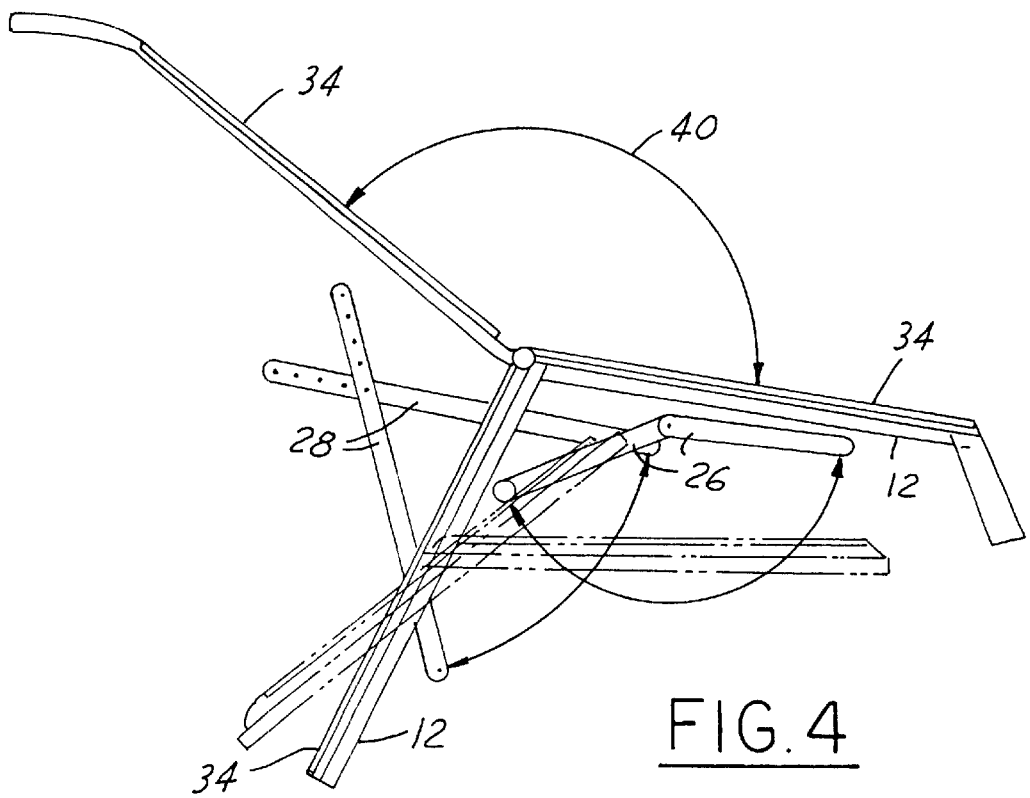
FIG. 4 is a schematic illustrate showing movement of a deck lid of an embodiment of a trunk assembly in accordance with the present invention.

Although the deck lid 12 may be stowed in a variety of positions, one preferred embodiment stows the deck lid 12 behind the rear seats 24 of the vehicle. A variety of mechanisms may be utilized to move the deck lid 12 into the stowed position 20. One contemplated configuration uses pivot bars 26, 28 to control movement of the deck lid 12. In this preferred embodiment, a short pivot bar 26 allows the deck lid 12 to be folded down into the cargo bay 22 (see FIG. 4). A longer pivot bar 28 is also utilized to help position the deck lid 12 against the front portion 30 of the cargo space 22. A spring element 32 may be used to bias the deck lid 12 towards the closed position 16. Again, although a specific mechanical configuration has been described allowing the deck lid 12 to be moved into the stowed position 20, it should be understood that a wide variety of mechanical configurations are contemplated.

Figure 5:
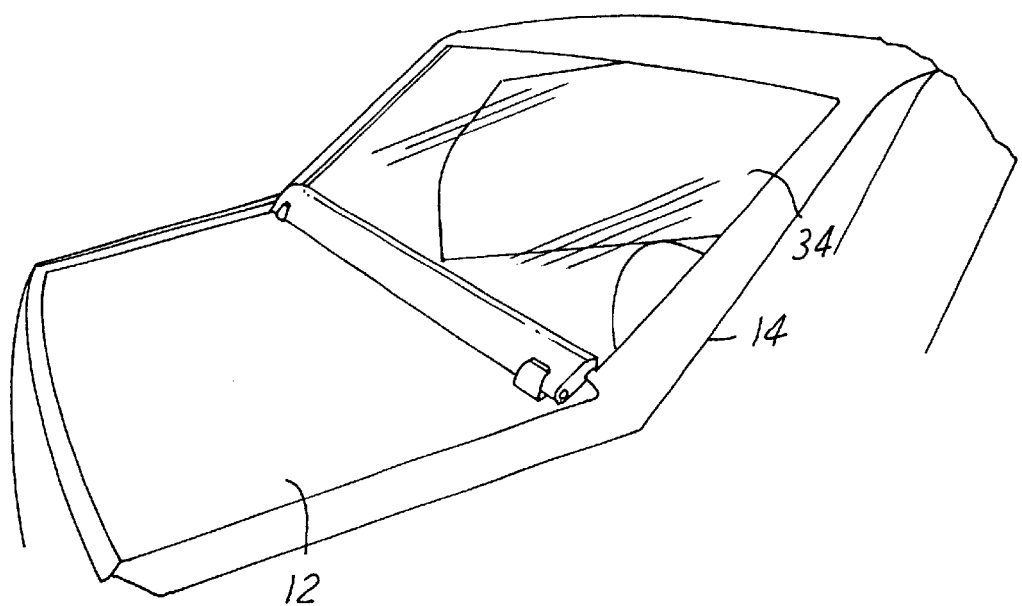
FIG. 5 is an illustration of a trunk assembly in accordance with the present invention, with an optional rear window in a closed position.
Figure 6:
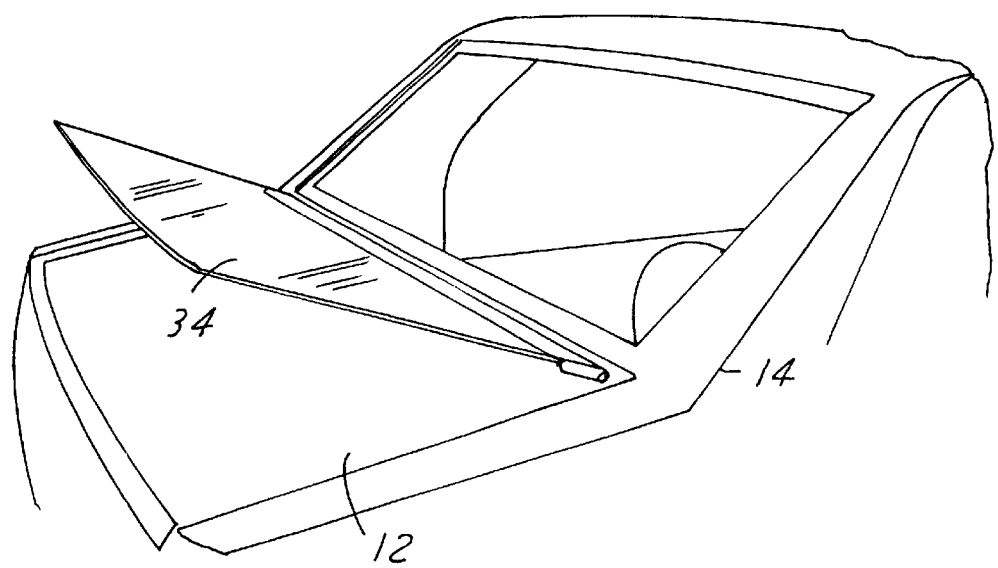
FIG. 6 is an illustration of a trunk assembly in accordance with the present invention, illustrating a rear window being folded into an open position.

In addition to the advantages the present invention provides by allowing a conventional trunk to be utilized as a pick up box, the present invention may further incorporate additional features for enhanced performance. One such enhancement allows the rear window 34 to be folded down and stowed on top of the deck lid 12 (see FIGS. 5 and 6). This ability to fold down the rear window 34 allows for improved air circulation within the vehicle 14. In addition, the fold down rear window 34 feature may be incorporated into a convertible design (not shown) to allow for improved convertible top storage. It is contemplated that the flip down rear window 34 may then be moved with the deck lid 12 into the stowed position 20 as was illustrated in FIG. 3 and was indicated by the arrow 40 in FIG. 4. By stowing the flip down rear window 34 along with the deck lid 12, the rear window 34 may be protected from damage while transporting oversized objects. This may further increase the utility of the stowable deck lid 12.

Figure 7:
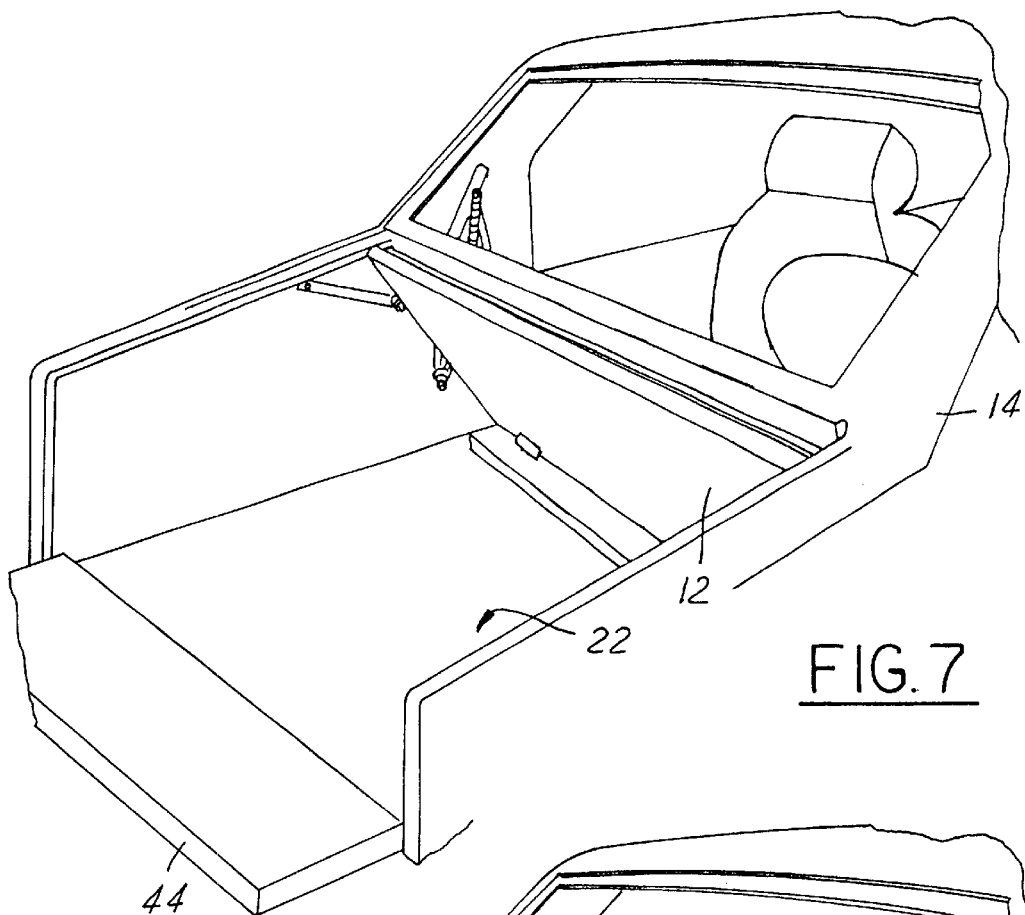
FIG. 7 is an illustration of a trunk assembly in accordance with the present invention, illustrating an optional flip down tailgate.
Figure 8:
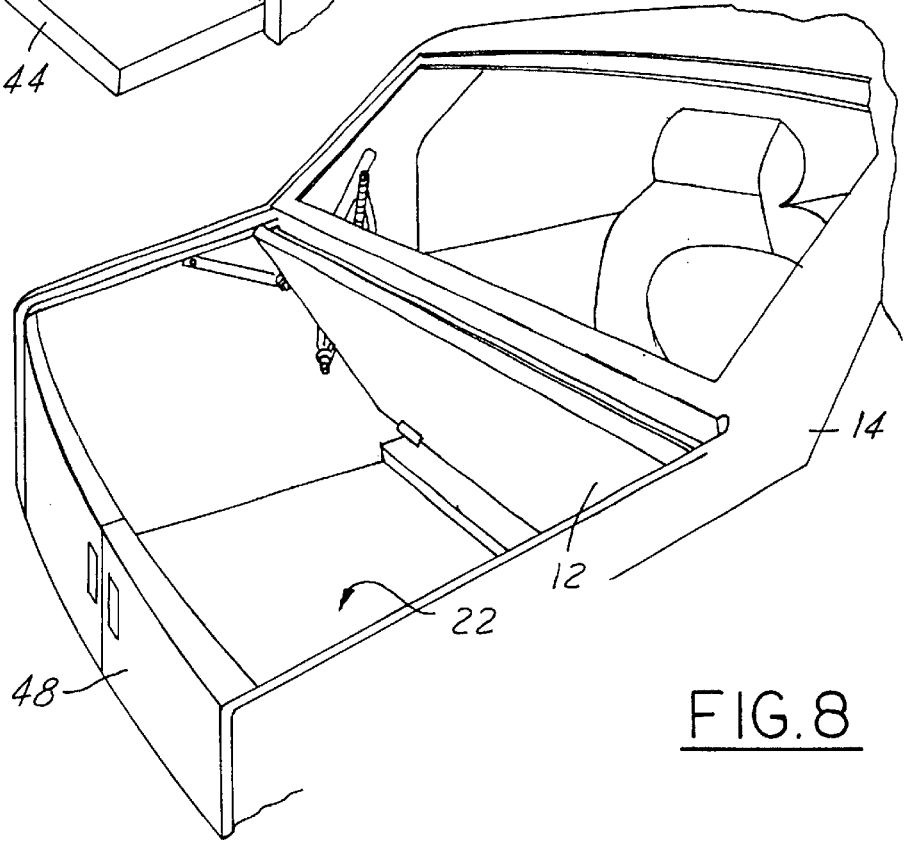
FIG. 8 is an illustration of a trunk assembly in accordance with the present invention, illustrating optional tailgate doors.

Additional features may also be incorporated, such as a flip down tailgate 44 (see FIG. 7), or tailgate doors 48 (see FIG. 8) to further improve convenience and ease in which oversized objects may be placed within the cargo area 22. Although these and other features may be combined with the stowable deck lid 12 in order to practice the present invention, they need not be utilized in order for the present invention to provide improved utility. The improved access and functionality that the stowable deck lid 12 adds to the cargo gate 22 is alone quite beneficial.

Figure 9:
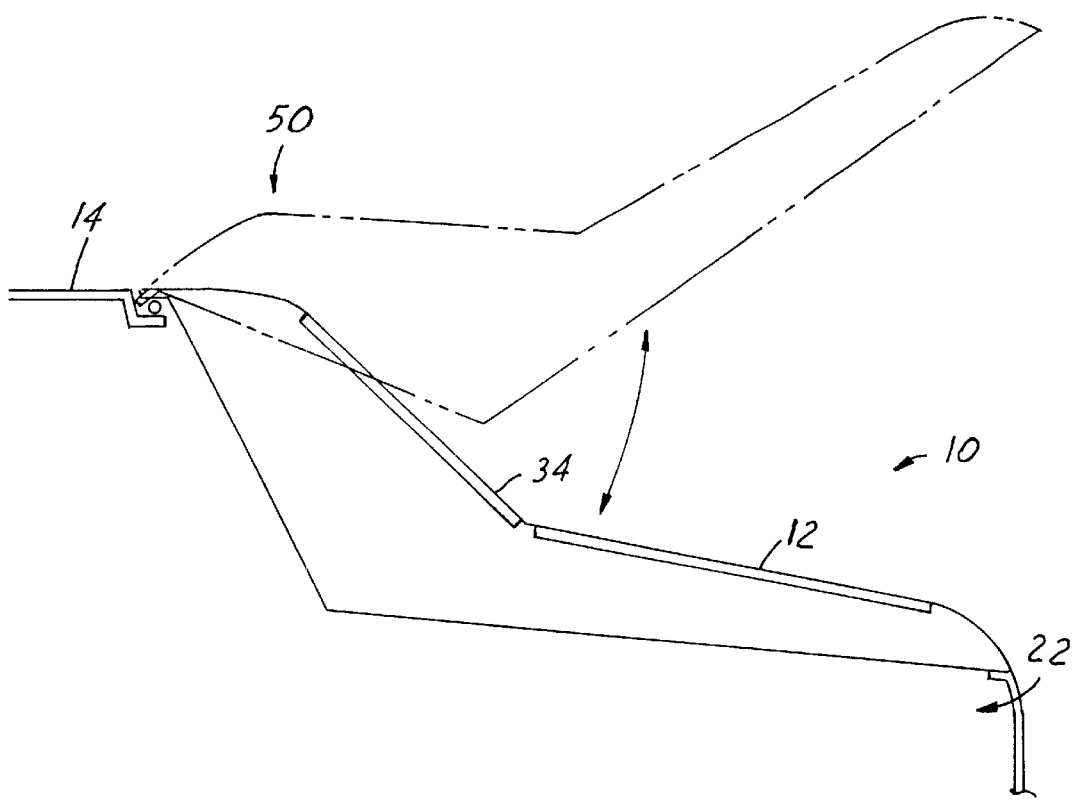
FIG. 9 is an illustration of a trunk assembly in accordance with the present invention, illustrating the trunk assembly incorporated into a hatchback.

Finally, it is contemplated that the trunk assembly 10 may be incorporated into a wide variety of automobile designs. In the embodiments illustrated in FIGS. 1 through 9, the trunk assembly 10 has been shown illustrated in a standard automobile trunk design. In other embodiments the trunk assembly 10 may be incorporated into alternative automotive designs such as convertibles (not shown). In one such alternate embodiment, illustrated in FIG. 9, the trunk assembly 10 is shown incorporated into a hatchback assembly 50. This embodiment provides additional functionality by letting the user access the cargo area 22 by either opening the hatchback assembly 50 or by moving the deck lid 12 into the stowed position 20 (not shown).

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A trunk assembly comprising:
    a cargo compartment;
    and a deck lid moveable between an open position, a closed position, and a stowed position in the cargo compartment of the vehicle, wherein said stowed position allows said cargo compartment to be used as a pick up box.

2. A trunk assembly as described in claim 1 further comprising:
    a rear window, rotatable to store on top of said deck lid, and moveable with said deck lid into said stowed position.

3. A trunk assembly as described in claim 1 further comprising:
    a tailgate.

4. A trunk assembly as described in claim 1 further comprising:
    tailgate doors.

5. A trunk assembly as described in claim 1 wherein said deck lid, when in said stowed position, is positioned behind a rear seat of an automobile.

6. A trunk assembly as described in claim 1 further comprising:
    at least one pivot bar,
        said at least one pivot bar guiding said deck lid into said stowed position.

7. A trunk assembly as described in claim 6 further comprising:
    at least one spring element in communication with said at least one pivot bar, said at least one spring element biasing said deck lid in said closed position.

8. A trunk assembly as described in claim 1 for use in a hatchback assembly.

9. A trunk assembly comprising:
    a cargo compartment; and
    a deck lid moveable between a closed position and a stowed position in the cargo compartment of the vehicle, wherein said stowed position allows said cargo compartment to be used as a pick up box.

10. A trunk assembly as described in claim 9 further comprising:
    a rear window, rotatable to store on top of said deck lid, and moveable with said deck lid into said stowed position.

11. A trunk assembly as described in claim 9 further comprising:
    a tailgate.

12. A trunk assembly as described in claim 9 further comprising:
    tailgate doors.

13. A trunk assembly as described in claim 9 wherein said deck lid, when in said stowed position, is positioned behind a rear seat of an automobile.

14. A trunk assembly as described in claim 9 further comprising:
    at least one pivot bar,
        said at least one pivot bar guiding said deck lid into said stowed position.

15. A trunk assembly as described in claim 14, further comprising:
    at least one spring element in communication with said at least one pivot bar, said at least one spring element biasing said deck lid in said closed position.

16. A trunk assembly as described in claim 9 for use in a hatchback assembly.

* * * * *